INVENTORS
WILLIAM KRAY,
JOHN P. PECKA,
BY
McMorrow, Berman & Davidson
ATTORNEYS.

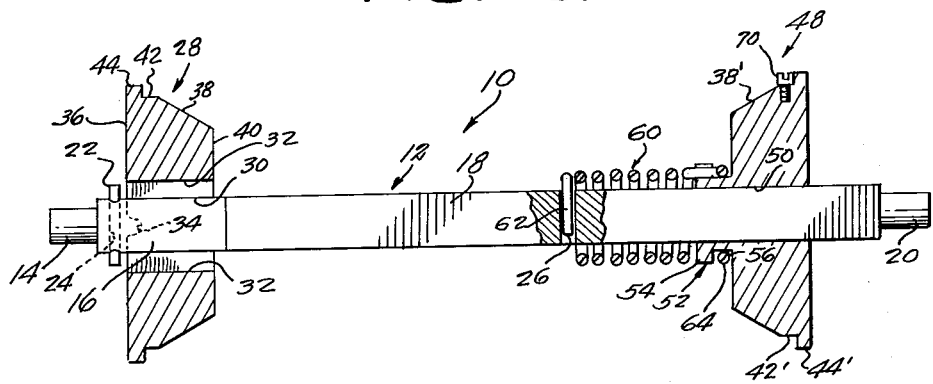
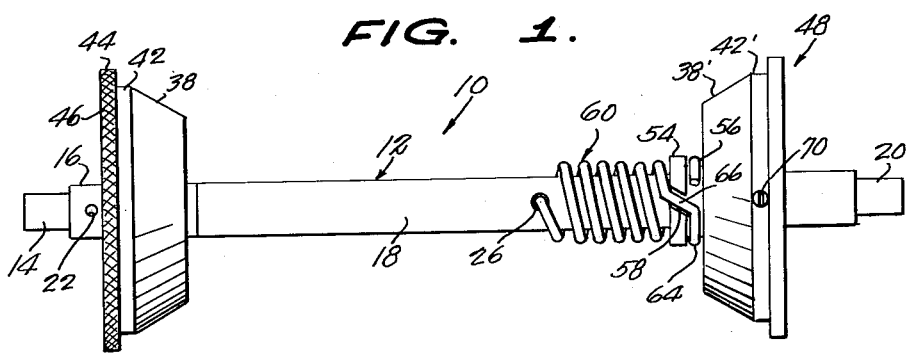
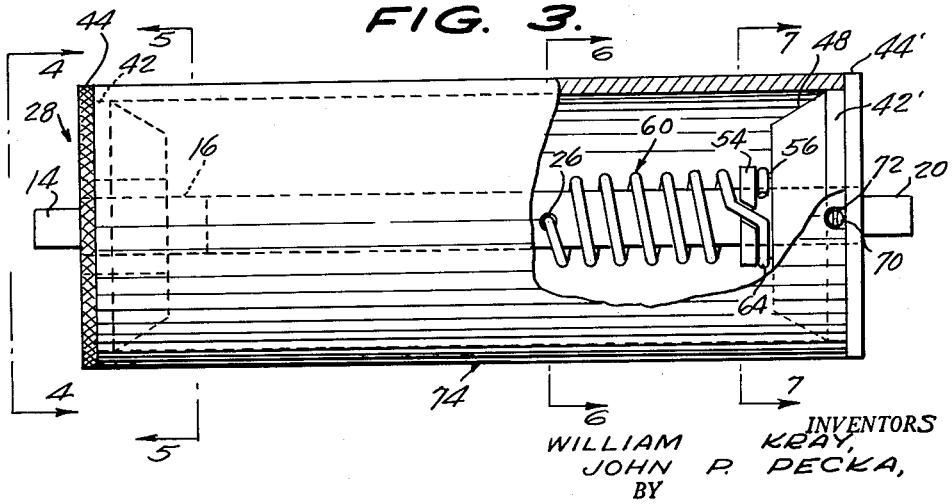
INVENTORS
WILLIAM KRAY,
JOHN P. PECKA,
BY
McMorrow, Berman + Davidson
ATTORNEYS May 9, 1961 W. KRAY ET AL 2,983,461
MANDREL Filed Dec. 5, 1958 2 Sheets-Sheet 2

United States Patent Office 2,983,461
Patented May 9, 1961

2,983,461

MANDREL

William Kray, 313 N. Irving St., and John P. Pecka, 24½ N. 2nd St., both of Allentown, Pa.

Filed Dec. 5, 1958, Ser. No. 778,424

1 Claim. (Cl. 242—68.4)

This invention relates to improved mandrels which have movable means for releasably holding thereon tubes or cylinders thereon.

The primary object of the invention is to provide simple, efficient, and low cost mandrels of this kind which provide the following advantages over present forms of mandrels:

(1) A simpler and better method of putting on and taking off tubes, which saves approximately two-thirds of the time usually required for these operations;

(2) Elimination of the need for tools in performing the above operations, no screws or nuts being involved, and the capability of the mandrels of being rotated in either direction, without producing tightening or loosening;

(3) Elimination of the lodging or jamming of tubes on the mandrels which usually requires the tubes to be forcibly driven off the mandrels, with the result that the tubes can be filled to larger diameters and hold more yardage;

(4) Interchangeability of parts of the mandrels among similar mandrels, so that worn parts can be readily replaced or serviced without having to return the mandrels to the factory for repair or servicing thereof;

(5) The mandrels can be easily and readily made any desired lengths simply by substituting shorter or longer shafts;

(6) Substantial reductions in costs of manufacture compared to other mandrels; and (7) Suitability of the mandrels for adoption and use in industries other than the textile industry employing tubes, such as paper mills and jute mills.

Another object of the invention is to provide mandrels of the character indicated above which are composed of only three principal parts, namely, a shaft or spindle, a removable relatively stationary head, and a spring-pressed head sliding on the shaft, both heads being mounted non-rotatably on the shaft, the spring-pressed head being urged toward the stationary head to mount and clamp a tube between the heads.

Other objects and advantageous features of the invention will be apparent from the following description and the accompanying drawings, wherein, for purposes of illustration only, a specific form of the invention is set forth in detail.

In the drawings:

Figure 1 is a side elevation of a mandrel of the invention, devoid of a tube;

Figure 2 is a side elevation, taken at right-angles to Figure 1, with the heads and a portion of the spindle or shaft in longitudinal section;

Figure 3 is an enlarged side elevation of the mandrel with a tube mounted thereon and partly broken away;

Figure 4:
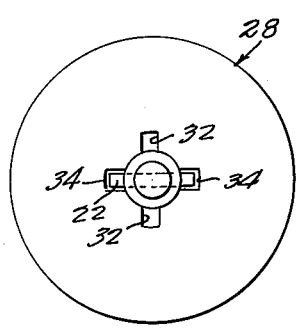
Figure 4 is a left-hand end elevation taken from the line 4—4 of Figure 3.
Figure 5:
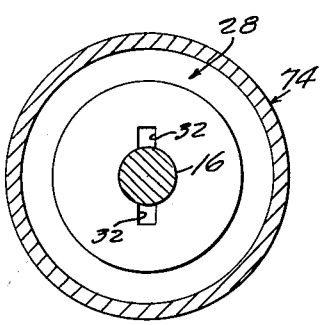
Figure 5 is a transverse section taken on the line 5—5 of Figure 3.
Figure 6:
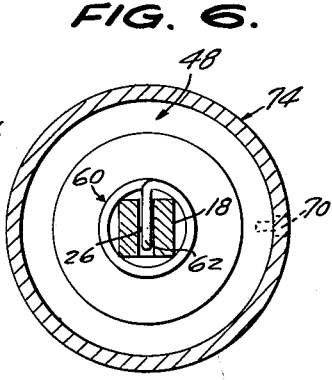
Figure 6 is a transverse section taken on the line 6—6 of Figure 3.
Figure 7:
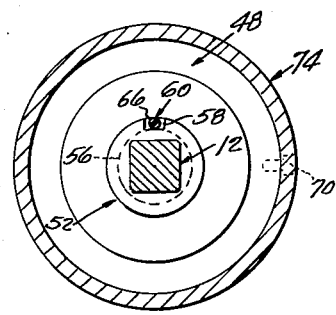
Figure 7 is a transverse section taken on the line 7—7 of Figure 3.

Referring in detail to the drawings, wherein like and related numerals designate like parts throughout the several views, and first to Figures 1 to 7 thereof, the mandrel therein illustrated, and generally designated 10, comprises an elongated shaft 12 of polygonal and preferably square cross section, having on a first end thereof a reduced diameter axial cylindrical bearing engaging pintle 14 which projects from a relatively short cylindrical end portion 16 at said first end of the main portion 18 of the shaft. On the second end of the shaft 12 and projecting axially from the end of the main portion 18 is a second reduced diameter cylindrical bearing engaging pintle 20.

The cylindrical shaft end portion 16 is traversed at its longitudinally outward end by a diametrical locking pin 22, which is preferably press fitted in a bore 24 extending through the portion 16. A spring retaining diametrical bore 26 extends through the main shaft portion 18 at a point at an approximate distance longitudinally inwardly from the second end of the shaft.

A first relatively stationary and removable mandrel head 28 is slidably and rotatably journaled on the cylindrical end portion 16 of the shaft 12, and is preferably in the form of a solid, relatively thick disc of metal or other suitable material, which is of appropriately larger diameter than the shaft 12 and has an axial bore 30 extending therethrough which fits the cylindrical shaft end portion 16. Opening into the bore 30 are two diametrically opposed longitudinal slots 32 which are sized to pass the ends of the locking pin 22. Located at ninety degrees from the slots 32 are two diametrically opposed notches 34 which indent the longitudinally outward flat end 36 of the head 28 at the sides of the bore 30. The slots 32 are provided to pass the locking pin ends so as to enable the head 28 to be put onto and removed from the cylindrical shaft end portion 16; and the notches 34 are provided to lockingly receive the ends of the locking pin for preventing rotation of the head relative to the shaft 12.

The periphery of the head 28 is tapered longitudinally inwardly, as indicated at 38, to a flat inward end 40, from a narrow annular and untapered tube end seat 42, and an annular shoulder 44 projects radially outwardly from the head 28 between the seat 42 and the flat outward end 36 of the head. The peripheral edge of the shoulder 44 is knurled, as indicated at 46, to facilitate manual rotation of the head 28.

A second spring-pressed sliding head 48, of substantially the same size and form as the stationary head 28, has an axial square bore 50 extending therethrough which slidably and non-rotatably fits on the main shaft portion 18. The head 48 has a longitudinally inward tapered portion 38', a tube end seat 42', and an annular shoulder 44', similar to those of the head 28. The square bore 50 is extended through a preferably integral and axial boss 52 on the inward end of the head 48. An enlarged diameter annular shoulder 54 on the inward end of the boss 52 defines a groove 56 with the inward end of the head 48, and a diagonal notch 58 is provided in the shoulder 54.

A contractile helical spring 60 is circumposed on the main shaft portion 18, between the spring retaining bore 26 and the head 48, and has on its longitudinally inward end a chordal terminal 62 which is engaged in the bore 26. The longitudinally outward convolution 64 of the spring 60 is circumposed on the boss 52 in the groove 56, and a straight diagonal spring portion 66 between the outward convolution 64 and the next spring convolution 68, is engaged in the diagonal notch 58 in the shoulder 54, whereby the spring 60 is anchored in place and against rotation on the shaft 12, and the head 48 is connected to the spring 60, and the spring serves to urge the head 48 inwardly toward the stationary head 28. A stop, preferably in the form of a stud 70, is threaded into and projects from the tube end seat 42' of the head 48, for engagement by the slot 72 in the adjacent end of one form of tube 74, as shown in Figure 3, whereby rotation of the tube 74 relative to the head 48 is positively precluded.

As is clear from Figure 3, related ends of the tube 74 are circumposed upon and seated on the tube end seats 42 and 42' of the heads 28 and 48, and bear against their shoulders 44 and 44', with the spring 60 stretched and under tension and acting to force the shoulders 44 and 44' frictionally and retainably against the ends of the tube 74, when the ends of the locking pin 22 are engaged in the notches 34 in the outward end of the head 28.

To remove the tube 74 quickly and easily, and without tools, from the mandrel 10, all that is necessary is to manually push the relatively stationary head 28 inwardly toward the spring-pressed head 48, against the resistance of the spring 60, far enough to disengage the locking pin ends from the notches in the head 28, and then rotate the head 28 by hand by means of the knurled shoulder 44 in order to locate the locking pin ends in the slots, so that the head can be pulled outwardly off the shaft 12 or is pressed off by the action of the spring 60. The tube 74 can then be removed from the head 48 and drawn off over the same end of the shaft 12. Putting the tube 74 on the mandrel involves a mere reversal of these operations. Mandrels of different effective lengths can be provided by interchanging for the shaft 12 other similar shafts of the desired lengths, and for tubes 74 of different diameters, heads of appropriate diameters can be interchanged for the heads 28 and 48, all without any alterations in the structure of the components. This interchangeability of parts also enables replacing from a stock on hand, any of the parts in case of wear or breakage, and eliminates the expense and loss of time otherwise involved in sending mandrels to the factory for service and repair.

It is obvious that, with regard to the connection of the spring 60 to the sliding head 48, that the end convolution 64 can be readily sprung out of the groove 56 in the boss 52 for releasing the head 48 for removal off the second end of the shaft 12, and that the arm 62 of the spring 60 can be readily removed from the bore 26 to free the spring 60 for removal from the shaft 12.

Figure 8:
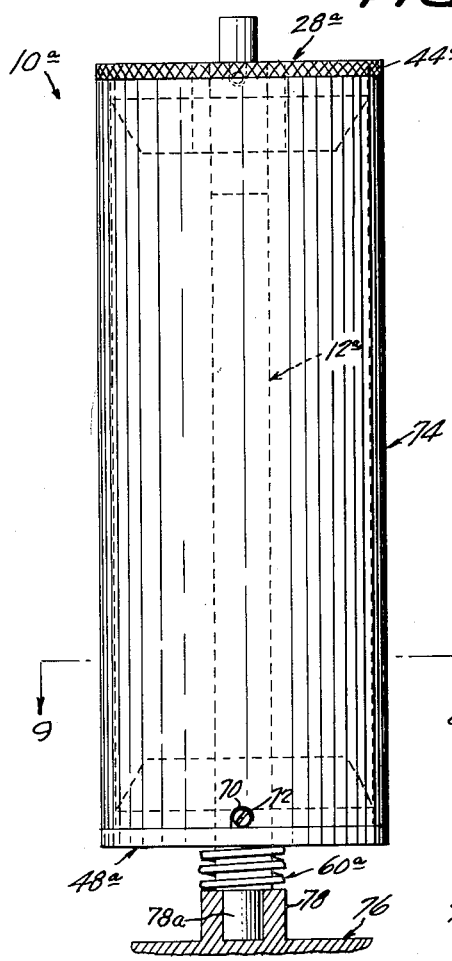
Figure 8 is a fragmentary side elevation showing another form of mandrel of the invention and its mounting on such as a frame, in an optional vertical position.
Figure 9:
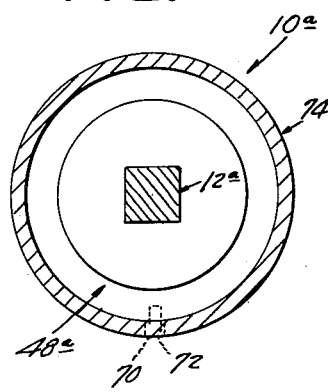
Figure 9 is a horizontal section taken on the line 9—9 of Figure 8.

The form of the invention shown in Figures 8 and 9, and generally designated 10a, provided to serve as a spindle bobbin to be mounted at one end in an erect, diagonal, or horizontal position relative to a support, such as a machine frame 76. This form has a relatively stationary head 28a, similar to the head 28 of Figures 1 to 7, which is similarly removably mounted on a similar shaft 12a, with the head 28a and the related end of the shaft 12a remote from the frame 76, and with the other end of the shaft 12a having a reduced spindle 78a seated in a socket bearing 78 on the frame 76.

The spring-pressed head 48a of the mandrel 10a is similar to the head 48 but is devoid of a shouldered boss 52, and the place of the spring 60 is taken by a helical spring 60a which is circumposed on the shaft 12a and is compressed between the socket 78 and the outward end of the head 48a.

It will be observed that the removable, relatively stationary heads 28 and 28a are rotatable on the shafts 12 and 12a in either direction for aligning the slots 32 and the notches 34 with the ends of the locking pin 22, in both removing and installing these heads on the shafts. Because of this and because of the chance of any threaded connections between the heads and between the shafts and the heads, there does not exist the possibility of tubes becoming lodged or jammed on the heads which is a common occurrence with mandrels in which such threaded connections exist, and wherein rotation of the mandrels produces unwanted tightening of the threaded connections.

Although there have been shown and described herein preferred forms of the invention, it is to be understood that the invention is not necessarily confined thereto, and that any change or changes in the structures of and in the relative arrangements of components thereof are contemplated as being within the scope of the invention as defined by the claim appended hereto.

What is claimed is:

A mandrel comprising a shaft having first and second ends having reduced axial pintles thereon, said shaft having a cylindrical portion at said first end and a polygonal cross section portion extending to said second end, a first sliding head mounted on said cylindrical portion, a second sliding head having a polygonal bore therethrough receiving said polygonal shaft portion, a helical spring circumposed on the shaft at the longitudinally inward side of the second sliding head, said spring having inward and outward longitudinal ends, first means removably securing said longitudinally inward end to the shaft against longitudinal and rotational movements relative to the shaft, second means removably and non-rotatably securing the longitudinally outward end of the spring to the second sliding head, said second securing means comprising a boss on the longitudinally inward end of the second sliding head, said boss having a circumferential groove therein defining an annular shoulder on the longitudinally inward end of the boss, said spring having an end convolution encircling and confined in said groove and a diagonal portion, said shoulder having a notch in which said diagonal portion is engaged.

References Cited in the file of this patent

UNITED STATES PATENTS

| | | |
|---|---|---|
| 841,727 | Shigley | Jan. 22, 1907 |
| 1,724,034 | Mayer | Aug. 13, 1929 |
| 2,045,433 | Wood | June 23, 1936 |
| 2,146,835 | Merwin | Feb. 14, 1939 |
| 2,185,780 | Uytenbogaart | Jan. 2, 1940 |
| 2,552,276 | Harvey | May 8, 1951 |
| 2,654,550 | Winkler | Oct. 6, 1953 |
| 2,705,112 | Baumgartner | Mar. 29, 1955 |

FOREIGN PATENTS

| | | |
|---|---|---|
| 459,265 | Germany | Apr. 30, 1928 |
| 471,249 | Great Britain | Aug. 31, 1937 |
| 774,432 | France | Sept. 17, 1934 |
| 882,541 | France | Mar. 1, 1943 |
| 1,094,948 | France | Dec. 15, 1954 |